Figure 3:
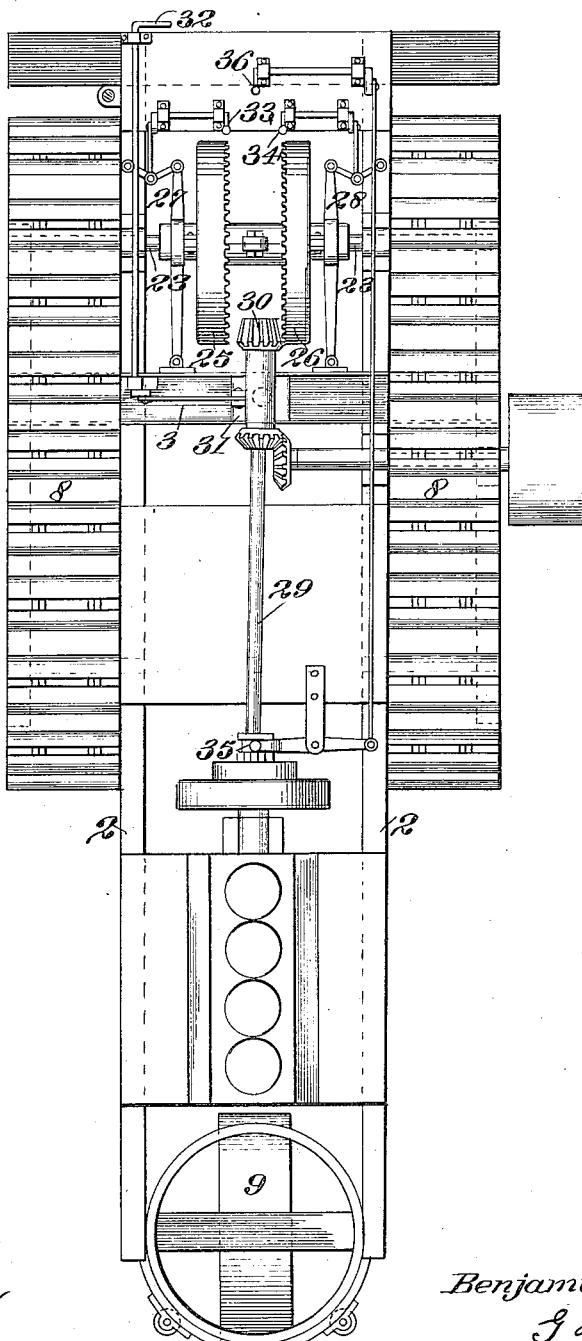

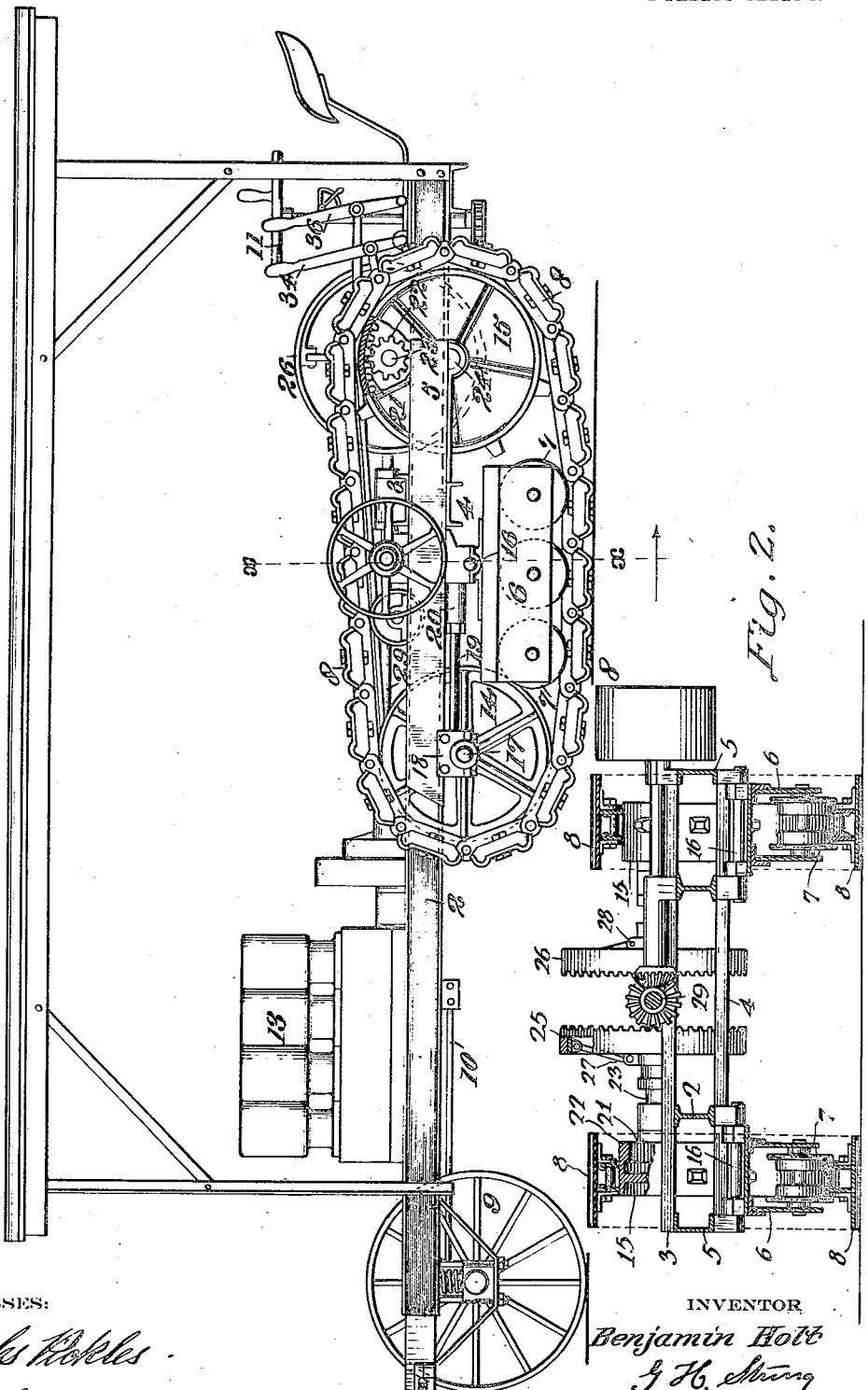

B. HOLT.
TRACTION ENGINE.
APPLICATION FILED FEB. 18, 1913.

1,076,578.

Patented Oct. 21, 1913.

2 SHEETS—SHEET 2.

WITNESSES:
Charles Pickles
F. E. Maynard.

INVENTOR
Benjamin Holt,
BY G. H. Strong
ATTORNEY

UNITED STATES PATENT OFFICE.

BENJAMIN HOLT, OF STOCKTON, CALIFORNIA.

TRACTION-ENGINE.

1,076,578.  Specification of Letters Patent.  Patented Oct. 21, 1913.

Application filed February 18, 1913. Serial No. 749,168.

*To all whom it may concern:*

Be it known that I, BENJAMIN HOLT, a citizen of the United States, residing at Stockton, in the county of San Joaquin and State of California, have invented new and useful Improvements in Traction-Engines, of which the following is a specification.

This invention relates to traction engines of the so-called "caterpillar" type, employing an endless, flexible traction member, or self-laying track.

The object of the present invention is to materially reduce the size of these machines as compared with those I have heretofore been building, and to simplify construction and reduce the number of parts in the transmission, so as to deliver the power from the motor as directly as possible to the traction members; also to provide for the mounting for the truck or trucks which run on the ground run of the traction members so as to permit the trucks to rock and give the desired cushioning action to the load without the use of springs, or the like.

There are other objects and advantages which will appear hereinafter.

The invention consists of the parts and the combination and construction of parts as hereinafter more fully described and claimed, having reference to the accompanying drawings, in which—

Figure 1 is a side elevation of the invention. Fig. 2 is a cross section on line X X, Fig. 1. Fig. 3 is a plan of the invention.

The engine frame, which may be of any suitable construction, preferably comprises two main longitudinal I-beams or sills 2, rigidly connected across at intervals by upper and lower cross-pieces 3—4, which latter project somewhat beyond the sides of the sills 2. The projecting ends of the cross-pieces 3—4 are connected by channels 5 to form lateral supplemental frames, but integral with the main frame for the accommodation of the rocking trucks 6, which have rollers 7 adapted to run on the ground run of the traction members 8. These traction members 8 support the chief weight of the vehicle.

9 is a front steering wheel having a connecting rod 10 which is suitably connected with the tiller wheel 11 adjacent to the driver's seat 12, at the rear of the vehicle.

13 is the motor by which power is transmitted back by suitable connections later to be described, for operating the traction members 8.

Each traction member consists of a series of conjoint links adapted to travel around front and rear sprockets 14—15, suitably journaled in line in the supplemental side frames. Front sprocket 14 is an idler, while the rear sprocket 15 is the driver.

Each truck 6 is mounted between a pair of respective sprockets 14—15, and is of such strength and rigidity as to provide in itself an inflexible, unyielding beam, against which the back of the ground run of the traction members 8 may bear. The back of the traction members forms trackways in the nature of continuous rails for the rollers 7 for truck 6 to run upon. The trucks 6 are each centrally and directly pivoted by a shaft 16 in the side frames 2—5, so that the truck has a limited rocking movement in a vertical plane about its shaft 16 as a fulcrum; all springs being dispensed with. The truck 6 is disposed between and independent of the sprockets 14—15, and the underside of the rollers 7 project a sufficient distance below the lowest points of the sprockets 14—15 so that these sprockets, or rather those portions of the traction member which are in immediate engagement with the sprockets, never come in contact with the ground. In other words, the entire weight of the vehicle, except what is carried on the steering wheel 9, is supported directly on the rocking trucks 6, independent of the sprockets 14—15.

Practice shows that this construction allows the flexible, endless traction member to accommodate itself to rocks, or other inequalities in the roadway encountered, without the traction member buckling upward, or without any material or objectionable vibration being imparted to the vehicle frame.

The direct pivoting of the trucks on the frame in the manner shown has been found in practical operation to give the necessary cushioning action to the vehicle, and without the interposition of any springs.

The front idlers 14 are journaled on independent shafts 17 mounted in sliding boxes 18, which engage the lower flanges of the pair of side beams 2—5. The take-up of slack in the tread belts is provided for by push rods 19 which have one end bearing against a sliding box 18, and the other end threaded into a sleeve 20 fast on the vehicle frame.

Each truck 6 by reason of the foregoing described mounting, has a limited oscillating movement about its fixed fulcrum 16, wholly independent of the sprocket wheels 14—15. As the operative face of each truck is normally in a plane below the level of the lowest point of the wheels 14—15, the truck is guided in line and permited to oscillate in a vertical plane freely about its pivot 16; the spaces between the wheels 14—15 and the slack of the belt being sufficient to allow the truck and the portion of the belt on which it rests to rock in unison; the truck being rigid and of sufficient length to be supported always on a plurality of links making up the belt so that there is no tendency of the ground run in the latter to undulate and thereby form an uneven, humpy track as the machine travels over it. By this truck construction whereby the pivot shafts 16 are comparatively short and contained within the width of the belt and of the side frame, I am enabled to put the trucks quite low and to support the load directly on the trucks. Another feature which conduces to a low-hung frame lies in the construction and operation of the drive sprockets 15. Each of these drive sprockets has an internal gear 21 engaged by a pinion 22 fixed on the end of a drive shaft 23 which extends clear across the machine between sprockets 15. The driving sprockets 15 for each traction member has its own independent short shaft 24, the ends of which are journaled in the supplemental side frames 2—5; there being no direct connections between the sprockets 15 on opposite sides of the machine except through the driving shaft 23. I find that by using short shafts 24 for each sprocket I am able to get a more compact and powerful construction than where it is attempted to mount both structures on one shaft and to interpose in this shaft a differential.

The drive shaft 23 carries two opposed normally loose master gears 25—26. Either one of these gears 25—26 may be locked to shaft 23 by suitable respective clutch mechanism 27—28, according to whether the machine is to be driven ahead or in reverse. Power to operate the master gears 25—26 is derived from the motor 13 to a suitable transmission, generally indicated by the transmission shaft 29, which carries a pinion 30 adapted to be thrown in and out of mesh with one or the other of the gears 25—26, according as the transmission shaft 29 is rocked in one direction or the other; a sliding bearing 31 operated by a clutch lever 32 being provided for the pinion end of the transmission shaft 29.

Clutches 27—28 are operated from the driver's seat by convenient means represented by the respective hand levers 33—34, as shown in the plan view Fig. 3.

36 is the lever for operating the engine clutch 35.

Having thus described my invention what I claim and desire to secure by Letters Patent is—

The combination with a vehicle frame of front and rear sprockets supported in bearings on the frame and themselves supporting no part of the weight of the vehicle, an endless, flexible track belt passing around and guided by the sprockets, a truck traveling on the ground run of the belt and having an extended operative face normally in a plane below the level of the sprockets whereby the latter carry no part of the weight of the load, said truck being centrally pivoted directly to the frame and capable of a limited rocking movement independent of the sprockets.

In testimony whereof I have hereunto set my hand in the presence of two subscribing witnesses.

BENJAMIN HOLT.

Witnesses:
R. E. MANN,
FRANKLIN S. HOLLEY.